(12) United States Patent
Lin et al.

(10) Patent No.: US 10,594,171 B2
(45) Date of Patent: Mar. 17, 2020

(54) POSITION TRACKING SYSTEM AND METHOD THEREOF

(71) Applicants: LITE-ON ELECTRONICS (GUANGZHOU) LIMITED, Guangzhou (CN); Lite-On Technology Corporation, Taipei (TW)

(72) Inventors: Shiang-Hua Lin, Taipei (TW); Kuang-Yao Liao, Taipei (TW); Ping-Mao Lee, Taipei (TW); Jiun-Yi Ke, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 89 days.

(21) Appl. No.: 15/884,400

(22) Filed: Jan. 31, 2018

(65) Prior Publication Data
US 2019/0148991 A1 May 16, 2019

(30) Foreign Application Priority Data

Nov. 10, 2017 (CN) .......................... 2017 1 1101318

(51) Int. Cl.
*H02J 50/40* (2016.01)
*H02J 50/90* (2016.01)
(Continued)

(52) U.S. Cl.
CPC .............. *H02J 50/90* (2016.02); *G01S 19/46* (2013.01); *H02J 50/40* (2016.02); *H02J 50/80* (2016.02);
(Continued)

(58) Field of Classification Search
CPC . G01S 19/46; H02J 50/40; H02J 50/80; H02J 50/90; H02J 50/12; H04W 4/70
(Continued)

(56) References Cited

U.S. PATENT DOCUMENTS

2015/0119071 A1* 4/2015 Basha ........................ G01S 1/68
455/456.1
2017/0110887 A1* 4/2017 Bell ........................ H02J 5/005
(Continued)

FOREIGN PATENT DOCUMENTS

TW 201728044 8/2017

OTHER PUBLICATIONS

"Office Action of Taiwan Counterpart Application," dated Feb. 23, 2018, p. 1-p. 6, in which the listed reference as cited.

*Primary Examiner* — Thienvu V Tran
*Assistant Examiner* — Brian K Baxter
(74) *Attorney, Agent, or Firm* — JCIPRNET (57) ABSTRACT

A position tracking system and a method thereof are provided. In the system, a power transmitting unit (PTU) provides power to a power receiving unit (PRU). The PRU chooses one of the PTUs adaptively to receive power, and broadcasts a broadcast information via a corresponding Bluetooth link. Three PTUs receive the broadcast information to obtain three pieces of position information respectively corresponding to the PRU respectively, and a position of the PRU is determined based on the position information of the three PTUs. Accordingly, positioning is implemented in the wireless charging technique by modifying software design.

12 Claims, 5 Drawing Sheets

(51) Int. Cl.
*H02J 50/80* (2016.01)
*G01S 19/46* (2010.01)
*H04W 4/70* (2018.01)
*H02J 50/12* (2016.01)
*H04W 4/029* (2018.01)

(52) U.S. Cl.
CPC .............. *H02J 50/12* (2016.02); *H04W 4/029* (2018.02); *H04W 4/70* (2018.02)

(58) Field of Classification Search
USPC ........................................................ 307/104
See application file for complete search history.

(56) References Cited

U.S. PATENT DOCUMENTS

| | | | | |
|---|---|---|---|---|
| 2018/0294673 | A1* | 10/2018 | Bae | H02J 7/02 |
| 2018/0301933 | A1* | 10/2018 | Lee | H01F 38/14 |
| 2018/0301936 | A1* | 10/2018 | Lee | H02J 7/02 |
| 2018/0323634 | A1* | 11/2018 | Lee | H02J 7/02 |

* cited by examiner

POSITION TRACKING SYSTEM AND METHOD THEREOF

CROSS-REFERENCE TO RELATED APPLICATION

This application claims the priority benefit of China application serial no. 201711101318.9, filed on Nov. 10, 2017. The entirety of the above-mentioned patent application is hereby incorporated by reference herein and made a part of this specification.

BACKGROUND OF THE INVENTION

1. Field of the Invention

The invention relates to a positioning technology, and particularly relates to a position tracking system based on a magnetic resonance (MR) technology and a position tracking method.

2. Description of Related Art

When away from home, people nowadays commonly learn their locations by using a satellite navigation system (e.g., the global positioning system (GPS), the global navigation satellite system (GLONAS), Beidou navigation satellite system, or the like). In addition, due to the increasing needs for management nowadays, the access management and position tracking of users or objects become more important. However, a satellite signal is unable to be received in an indoor environment or other environments, positioning by using the known satellite navigation systems becomes inapplicable. Hence, several positioning solutions are already proposed for such environments.

Also, for better convenience, more mobile apparatuses (e.g., smart phones, tablet computers, and the like) can be charged wirelessly without a charging wire. Taking the magnetic resonance (MR) wireless charging technology as an example, a mobile apparatus may serve as a power receiving unit (PRU) that receives power provided by a power transmitting unit (PTU) through coupling resonance. While the charging efficiency of the conventional wireless charging technology is slightly inferior to the charging efficiency of wired charging, wireless charging is still promising to become a main function of future electronic products after more efforts in research and development are devoted.

SUMMARY OF THE INVENTION

One or some exemplary embodiments of the invention provide a position tracking system and a position tracking method where a positioning function is introduced into the magnetic resonance (MR) wireless charging technology, so as to achieve indoor positioning and charging at the same time.

An embodiment of the invention provides a position tracking method. The position tracking method is adapted to position a power receiving unit (PRU) through multiple power transmitting units (PTUs), and the PTUs transmit power to the PRU based on a magnetic resonance (MR) technology. The method includes the following. The PRU adaptively chooses one of the PTUs to receive power, and broadcasts a broadcast information via a corresponding Bluetooth link. Three PTUs receive the broadcast information to respectively obtain three pieces of position information with respect to the PRU. A position of the PRU is determined based on the three pieces of position information of the three PTUs.

According to an embodiment of the invention, each position information includes a received signal strength, and determining the position of the PRU based on the three pieces of position information includes the following. Respective distances between the PRU and the PTUs are calculated based on received signal strengths of the PRU with respect to the PTUs, and the position of the PRU is determined based on the distances.

According to an embodiment of the invention, the Bluetooth link is a Bluetooth low energy (BLE) link, and broadcasting the broadcast information via the Bluetooth link includes the following. The broadcast information is added to a universally unique identifier (UUID) of a general attribute profile (GATT) service. The broadcast information included in data of the UUID is transmitted.

According to an embodiment of the invention, determining the position of the PRU based on the three pieces of position information includes the following. The position of the PRU is determined based on trilateration.

According to an embodiment of the invention, determining the position of the PRU based on the three pieces of position information includes the following. The three pieces of position information are transmitted to a backstage host. The position of the PRU is determined by the backstage host.

An embodiment of the invention provides a position tracking system. The position tracking system includes multiple PTUs and a PRU. The PTUs transmit power based on a MR technology. The PRU adaptively chooses one of the PTUs to receive power and broadcasts broadcast information via a Bluetooth link. Three PTUs respectively receive the broadcast information to obtain three pieces of position information with respect to the PRU, and a position of the PRU is obtained based on the three pieces of position information of the three PTUs.

According to an embodiment of the invention, each position information includes a received signal strength. The position of the PRU is obtained based on the respective received signal strengths of the PRU with respect to the PTUs.

According to an embodiment of the invention, the received signal strength is included in the broadcast information.

According to an embodiment of the invention, each Bluetooth link is a BLE link. The PRU adds the broadcast information to an UUID of a GATT service and transmits the broadcast information included in data of the UUID.

According to an embodiment of the invention, the position of the PRU is obtained based on trilateration.

According to an embodiment of the invention, the position tracking system further includes a backstage host. The backstage host receives the three pieces of position information from the PTUs, and determines the position of the PRU based on the three pieces of position information.

According to the above, based on the MR wireless charging technology, the indoor position tracking is able to be introduced by simply modifying the software program (i.e., adding a profile for transmission of the UUID and the received signal strength) and suitably disposing the PTUs and the backstage host without modification of the hardware design.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
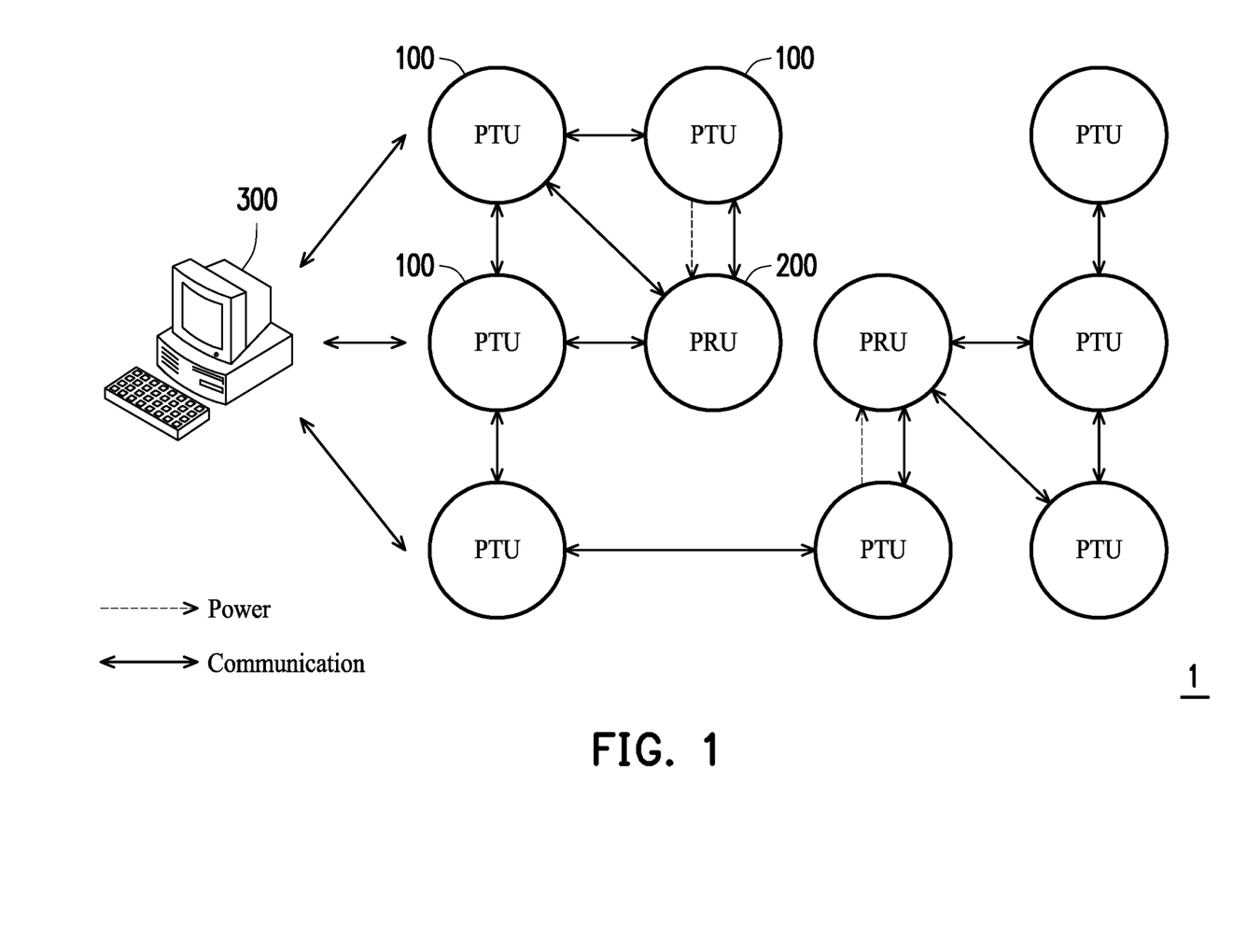
FIG. 1 is a schematic view illustrating a position tracking system according to an embodiment of the invention.

FIG. 1 is a schematic view illustrating a position tracking system 1 according to an embodiment of the invention. Referring to FIG. 1, the position tracking system 1 includes a power transmitting unit (PTU) 100, a power receiving unit (PRU) 200, and a backstage host 300. The numbers of the respective apparatuses are shown in FIG. 1 only for an illustrative purpose, but at least three PTUs 100 and one PRU 200 are required, so as to position the PRU 200 through the three PTUs 100.

Figure 2:
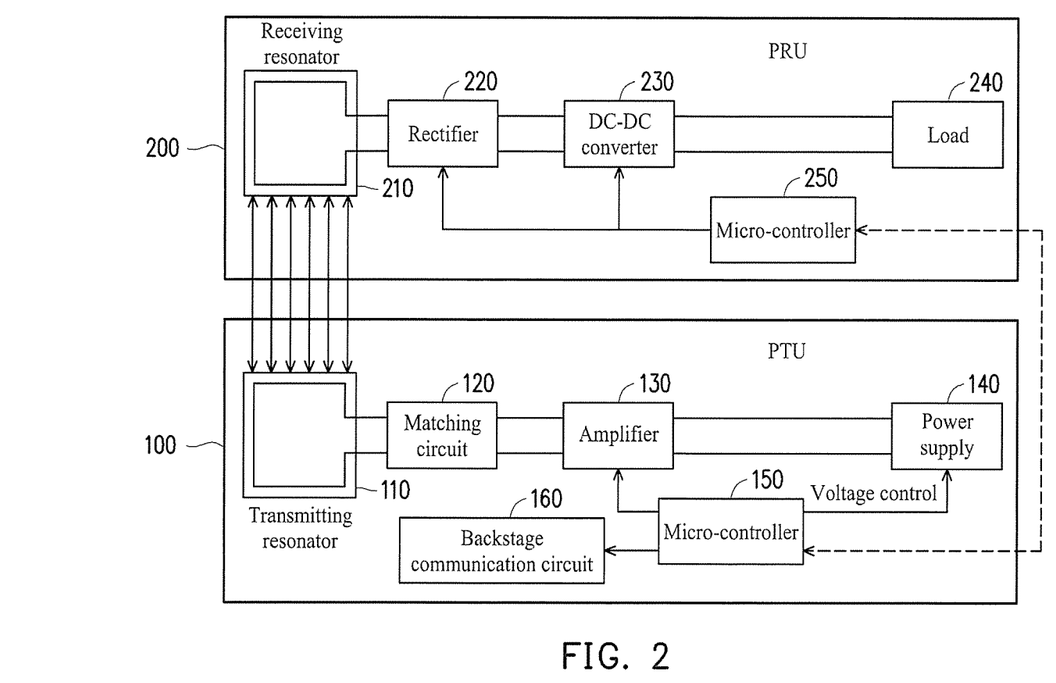
FIG. 2 is a block diagram illustrating components of a power transmitting unit and a power receiving unit according to an embodiment of the invention.

Referring to FIG. 2, FIG. 2 is a block diagram illustrating components of the PTU 100 and the PRU 200. The PTU 100 is a wireless charger, and includes, but is not limited to, a transmission resonator 110, a matching circuit 120, an amplifier 130, a power supply 140, a micro-controller (MCU) 150, and a backstage communication circuit 160 (optional).

The transmitting resonator 110 has a sensing coil and a resonating circuit, so as to be operated at a resonating frequency of 6.78 MHz. The matching circuit 120 is a circuit formed by inductors and capacitors in various forms (e.g., serial connection, parallel connection, matrix network, etc.). The amplifier 130 is a circuit that facilitates or maintains a signal output power, such as an operation amplifying circuit, a buffer, or an instrumentation amplifier. The power supply 140 may be any kind of batteries or a connector connected with power grids. The MCU 150 may be a central processing unit (CPU), or other programmable general-purpose or specific-purpose microprocessor, digital signal processor (DSP), programmable controller, application specific integrated circuit (ASIC), other similar components, or a combination thereof. The MCU 150 is adapted to handle all software program operations of the PTU 100. In addition, in the embodiment, a Bluetooth transceiver, circuit, chip, or system-on-chip (SoC) is further integrated into the MCU 150, and the MCU 150 is compatible with the Bluetooth low energy (BLE) standard and is able to process out-of-band signaling. The backstage communication circuit 160 may be a network processor, circuit, transceiver, or SoC compatible with wired communication via optic fibers, Ethernet network, or a bus, for example, or the backstage communication circuit 160 may be a network processor, circuit, transceiver, or SoC compatible with wireless communication technologies such as Wi-Fi, ZigBee, or the like.

The PRU 200 may be a portable apparatus such as a smart phone, a tablet computer, a wearable apparatus, a notebook computer, or the like, and at least include, but is not limited to, a receiving resonator 210, a rectifier 220, a DC-to-DC converter 230, a device load 240, and a micro-controller (MCU) 250.

The receiving resonator 210 has a sensing coil and a resonating circuit, and is resonant coupled with the transmitting resonator 110 at the resonating frequency of 6.78 MHz. The rectifier 220 may be various types of full-wave or half-wave rectifier. The DC-DC converter 230 is a converter configured to convert a DC power source into another DC power source at a different voltage. The device load 240 may be an electronic apparatus that consumes power, such as a display, a speaker, a microphone, or the like. Examples of the micro-controller 250 may be referred to the micro-controller 150. The micro-controller 250 is able to handle all software program operations of the PRU 200, and integrates a Bluetooth transceiver, circuit, chip or SoC (compatible with the BLE standard), so as to bilaterally communicate with the MCU 150.

Based on the hardware structure, the PTU 100 is not only able to transmit power to the PRU 200 through a magnetic resonance (MR) technology, but is also able to bilaterally communicate with the PRU 200 through the Bluetooth technologies. Details of the hardware structure may also be referred to standards of the AirFuel resonance wireless charging technology or other magnetic resonance wireless charging technologies, and thus will not be repeated in the following. Besides, in other embodiments, the MCUs 150 and 250 and the integrated Bluetooth transceivers, circuits, or SoCs may also be respective independent components (i.e., the Bluetooth components are not integrated with the MCUs).

Figure 3:
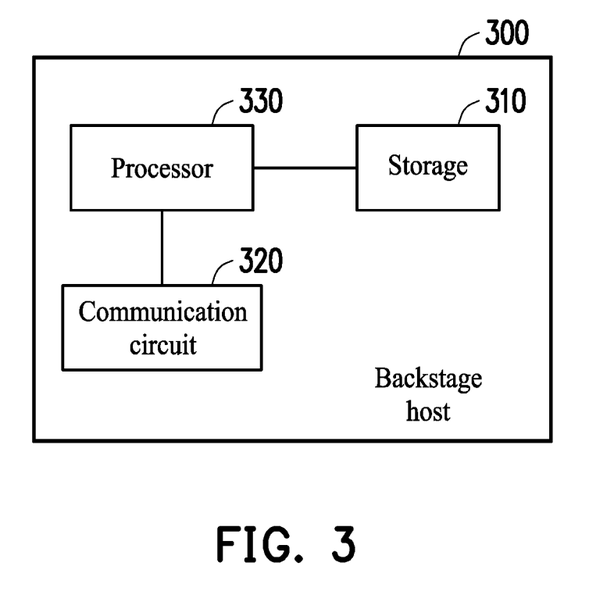
FIG. 3 is a block diagram illustrating components of a backstage host according to an embodiment of the invention.

Referring to FIG. 3, FIG. 3 is a block diagram illustrating components of the backstage host 300. The backstage host 300 may be an electronic apparatus such as a desktop computer, a laptop computer, a server, a computer workstation, or the like, and at least include, but is not limited to, a storage 310, a communication circuit 320, and a processor 330. The storage 310 may be any type of static or removable random access memory (RAM), read-only memory (ROM), flash memory, hard disk drive, solid-state drive, similar components, or a combination thereof. In addition, the storage 310 is configured to store information, data, and files relating to position information (e.g., a distance with respect to another apparatus, received signal strength, or the like), a universally unique identifier (UUID), the position of the PRU 200, or the like. Examples of the communication circuit 320 may be referred to the backstage communication circuit 160, so that the backstage host 300 and the PTU 100 may transmit signals to each other. Examples of the processor 330 may be referred to the MCU 150, and the processor 330 handles all software program operations of the backstage host 300.

In order to meet the hardware design of the PTU in the original MR technology, the communication circuit 320 in the embodiment may be a Bluetooth transceiver, circuit, chip, or SoC. Accordingly, the PTU 100 does not additionally require the backstage communication circuit 160, and the communication circuit 320 may directly establish a Bluetooth link to the MCU 150 to transmit or receive data. Nevertheless, in other embodiments, the PTU 100 may also include the backstage communication circuit 160 and communicate with the backstage host 300 via communication technologies other than the Bluetooth technology.

Figure 4:
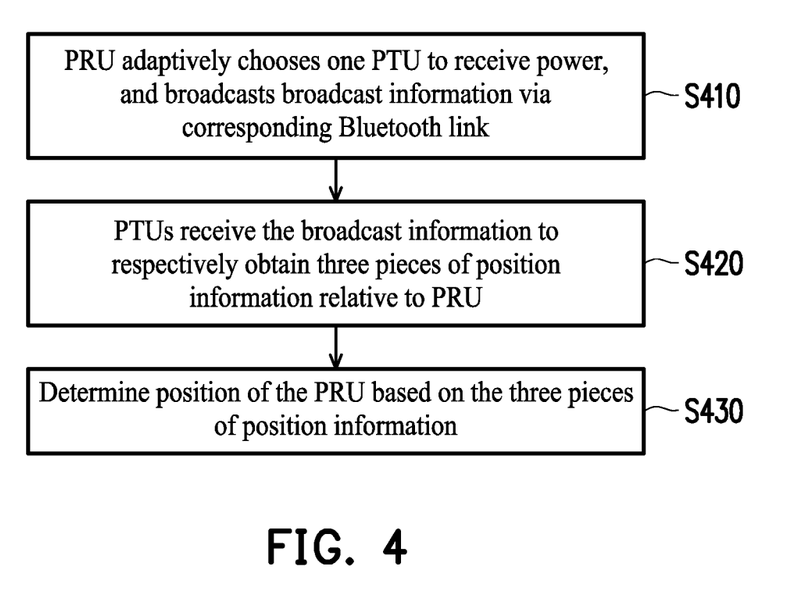
FIG. 4 is a flowchart illustrating a position tracking method according to an embodiment of the invention.

In order to clearly describe operations according to the embodiments of the invention, several embodiments are described in the following to explain in detail how the PRU 200 is positioned in the position tracking system 1. FIG. 4 is a flowchart illustrating a position tracking method according to an embodiment of the invention. Referring to FIG. 4, the method of the embodiment is applicable for the respective apparatuses in the position tracking system 1 shown in FIG. 1. In the following, the method of the embodiment is described with reference to the respective apparatuses and positions of the respective apparatuses in the position tracking system 1 of FIG. 1. Respective processes in the method may be adjusted based on implementation details and are not limited to those described in the following. In addition, the positions of the respective apparatuses in the drawings may be adjusted based on needs, the positions illustrated herein are only described as an example to help facilitate the understanding.

Taking the PRU 200 at the upper left corner of FIG. 1 as an example, the PRU 200 may adaptively choose the adjacent PTU 100 to receive power, and correspondingly broadcast the broadcast information via a Bluetooth link (step S410). Specifically, regarding power transmission, the PRU 200 may choose the closest PTU 100 or the PTU 100 with the highest signal strength to receive power. Assuming that the PRU 200 chooses the closer PTU 100 above the PRU 200 or the PTU 100 above has the highest signal strength with respect to the PRU 200, the PTU 100 is chosen and provide power to the PRU 200.

It should be noted that, when the PRU 200 is motionless or being moved, the MCU 250 may constantly compare the power signal strengths of different PTUs 100 to switch to the PTU 100 with the highest signal strength to receive power.

Regarding data transmission, since the PTU 100 and the PRU 200 are compatible with the BLE standard supporting one-to-multiple data transmission, the PRU 200 may respectively establish BLE connections with PTUs 100 within a specific range (e.g., within 10 or 15 meters). In the embodiment, the PRU 200 establishes a Bluetooth link with the PTU 100 that transmits power. After the Bluetooth link is established, the PTU 100 and the PRU 200 may transmit/receive data to/from each other via the corresponding Bluetooth link. Under the circumstance, the MCU 250 of the PRU 200 may also detect or obtain received signal strengths (e.g., received signal strength indicators (RSSI), received power (RX), or other values relating received signal strengths) with respect to the PTUs 100 to obtain position information with respect to the adjacent PTUs 100. With the received signal strengths, distances of the PRU 200 with respect to the PTUs 100 may be calculated based on Formula (1):

$$d = 10^{((|RSSI|-A)/(10*n))} \qquad (1)$$

wherein d represents the distance, RSSI represents the received signal strength indicator (negative), A refers to a signal strength when a transmitting end (i.e., the PTU 100) and a receiving end (i.e., the PRU 200) is in a distance of one meter, and n represents an environmental attenuation factor.

The received signal strength or the distance d may be adopted as the position information. To simplify the operation of the PRU 200, the position information of the embodiment is the received signal strength, and the distance d is calculated subsequently by other apparatuses.

Then, the PRU 200 may transmit the broadcast information via the established Bluetooth link. Specifically, in a software operation flow based on the BLE standard, after the BLE connection is established in a normal system operation flow, the MCU 250 may call to process BLE events during a BLE connection event period. Under the circumstance, the MCU 250 may choose (establish one or use an existing one) an universally unique identifier (UUID) of a general attribute profile (GATT) service and add broadcast information to the UUID. For example, the broadcast information is filled into a specific field of a payload, a header, or a characteristic of corresponding data of the chosen UUID. The chosen UUID thus represents the PRU 200. Then, the MCU 250 may transmit the broadcast information included in the data of the chosen UUID via the established BLE link to the MCU 150 of the corresponding PTU 100.

It should be noticed that, in the embodiment, the BLE standard is adopted to meet the AirFuel resonance wireless charging technology. However, in other embodiments, the MCUs 150 and 250 may also be compatible with the basic rate (BR)/enhanced data rate (EDR) of Bluetooth, or a dual mode combining BR/EDR and BLE, and the position information needs to be included in another profile in correspondence with a change of communication protocol.

Since the PRU 200 transmits the broadcast information through broadcasting, other adjacent PTUs 100 may also receive the broadcast info nation. Accordingly, the MCUs 150 of the PTUs 100 may also detect the received signal strengths in connection with reception of the broadcast information, thereby obtaining three pieces of position information with respect to the PRU 200 (Step S420). The received signal strengths received by different PTUs 100 may differ as distances with respect to the PRU 200. In addition, since the broadcast information includes the UUID representing the PRU 200, the respective MCUs 150 are able to identify the PRU 200 corresponding to the position information without being confused with broadcast information broadcasted by another PRU 200.

After receiving the three pieces of position information, the MCU 150 may transmit the three pieces of position information to the backstage host 300. If the backstage communication circuit 160 is disposed, the three pieces of position information are transmitted via the backstage communication circuit 160. Accordingly, the processor 330 may calculate the position of the PRU 200 based on trilateration (Step S430). Specifically, assuming that the storage 310 of the processor 330 already records the position information of all the PTUs 100 (e.g., converting the position information into coordinates of various coordinate systems, such as $(x_1, y_1)$ as the coordinate of the PTU 100 at the upper left of the PRU 200 in FIG. 1, $(x_2, y_2)$ as the coordinate of the closest PTU 100 at the upper right of the PRU 200, and $(x_3, y_3)$ as the coordinate of the closest PTU 100 at the lower left of the PRU 200), the processor 330 may further derive, based on Formula (1), or directly obtain the distances d between the PRU 200 and the different PTUs 100. In FIG. 1, the distance between the PRU 200 and the PTU 100 at the upper left of the PRU 200 is $d_1$, the distance between the PRU 200 and the closest PTU 100 at the upper right of the PRU 200 is $d_2$, and the distance between the PRU 200 and the closest PTU 100 at the lower left of the PRU 200 is $d_3$. Based on three circles using the distances $d_1$, $d_2$, and $d_3$ as radii, the position of the PRU 200 is obtained based on the Pythagorean theorem (the coordinate of the PRU 200 is ($x_0$, $y_0$), and detailed derivation may be referred to the known formula of trilateration, and thus will be omitted in the following):

$$(x_1-x_0)^2+(y_1-y_0)^2=d_1^2 \quad (2)$$

$$(x_2-x_0)_2+(y_2-y_0)^2=d_2^2 \quad (3)$$

$$(x_3-x_0)_2+(y_3-y_0)^2=d_3^2 \quad (4)$$

In the embodiment described above, the received signal strength is included in the broadcast information. However, in other embodiments, the broadcast information may include the UUID only without the received signal strength, and the PTU 100 transmitting power may directly detect the received signal strength responsive to the broadcast information. To simplify operations of the PTU 100 and the PRU 200, the relative position of the PRU 200 is calculated by the backstage host 300 in the above embodiment. However, in other embodiments, the MCU 150 of the PTU 100 may also obtain the two pieces of position information obtained by the other two PTUs 100, or the PRU 200 may obtain the three pieces of position information obtained by the three PTUs, so as to calculate the relative position of the PRU 200. Therefore, the backstage host 300 may be omitted. Besides, in the above embodiment, position information corresponding to at least three apparatuses are required in order to meet the requirement of trilateration. However, there are also other measurement formulae for calculating an unknown coordinate based on distance and known coordinates. Thus, the user may make adjustment based on needs, as long as at least three pieces of position information are available.

Figure 5:
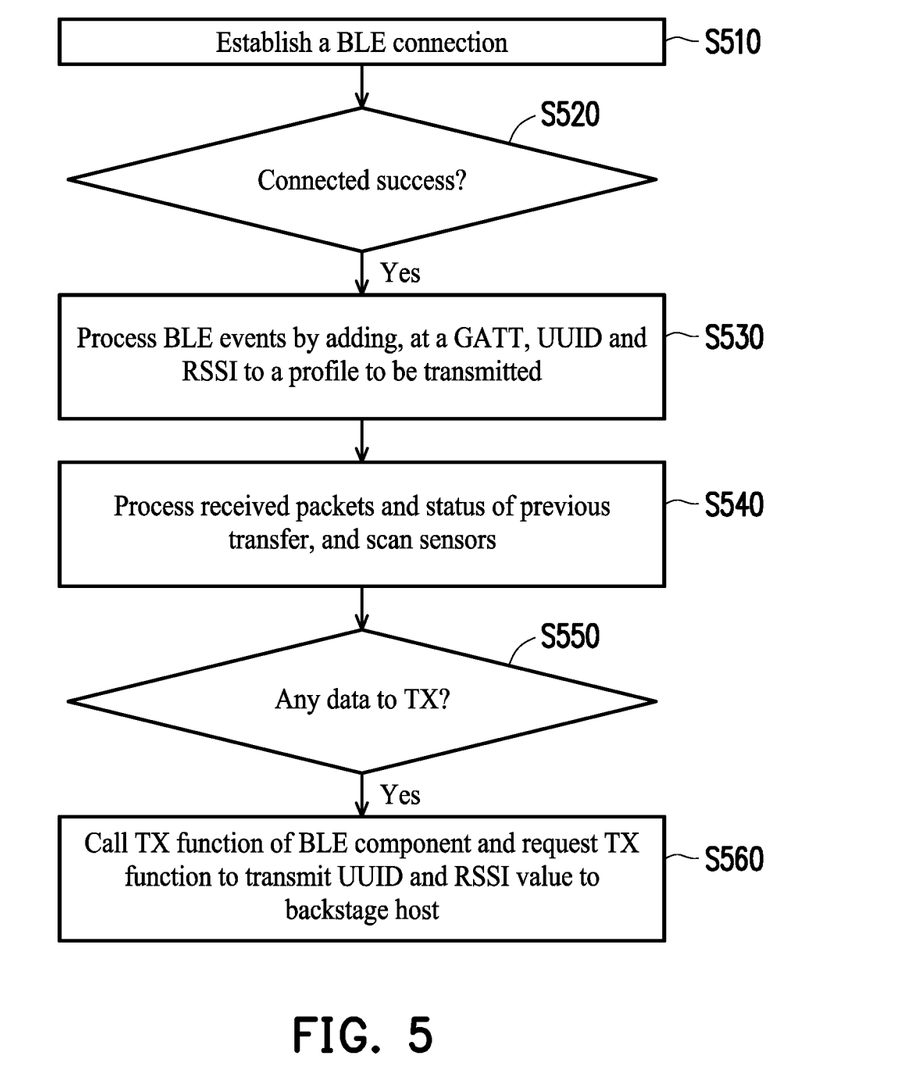
FIG. 5 is a flowchart illustrating an operation of a power receiving unit according to an embodiment of the invention.

For ease of understanding, a software operation flowchart based on the BLE standard is described in the following as an example. Referring to FIG. 5, FIG. 5 is a flowchart illustrating an operation of the PRU 200. The MCU 250 firstly establishes a BLE connection with the MCU 150 (Step S510). After the connection is established successfully (Step S520), the MCU 250 may process BLE events by adding, at the GATT, the UUID and RSSI to a profile to be transmitted (Step S530). Then, the MCU 250 processes received packets and status of previous transfer, and scans sensors (Step S540), and then verifies whether there is any data to be transmitted (Step S550). Then, the MCU 250 calls a transmitting (TX) function of a BLE component, and requests to transmit the UUID and the RSSI value to the backstage host 300 (Step S560), so that the MCU 250 may broadcast the UUID and the RSSI value.

Figure 6:
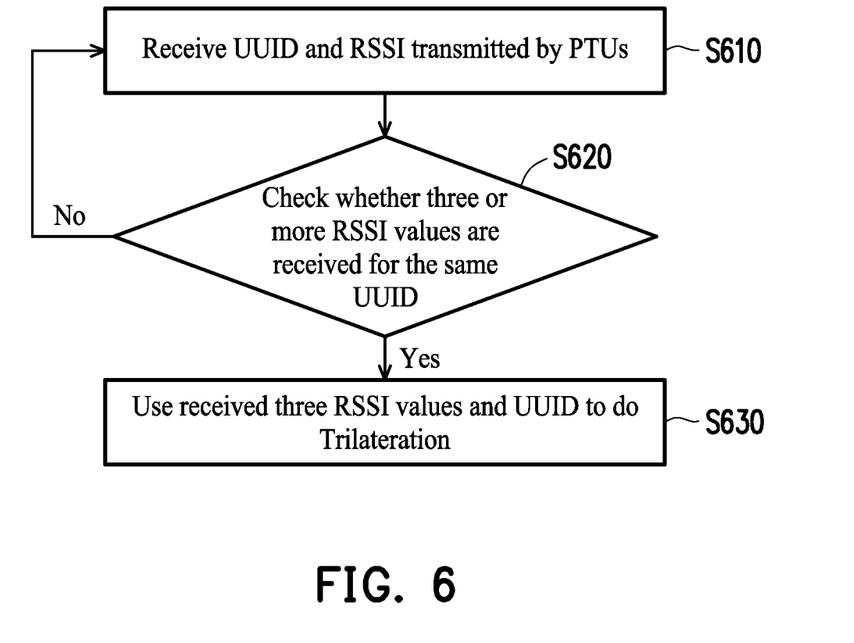
FIG. 6 is a flowchart illustrating an operation of a backstage host according to an embodiment of the invention.

After multiple PTUs 100 receive the UUID and the RSSI value, a flowchart of an operation of the backstage host 300 is shown in FIG. 6. The processor 330 may receive the UUID and the RSSI value from the PTU 100 through the communication circuit 320 (Step S610) and check whether three or more RSSI values for the same UUID (i.e., corresponding to one PRU 200) are received (Step S620). If the total number of RSSI values is less than three, the backstage host 300 may continue to receive the RSSI values of the UUID (i.e., returning to Step S610). If the total number of RSSI values is three, the processor 330 may use the received UUID and the three RSSI values and do trilateration, so as to determine the relative position of the PRU 200.

The embodiments of the invention have a general applicability. For example, the positions of specific patients, nurses, doctors, or medical facilities may require control and supervision, so the PRUs 200 may be implemented in the electronic equipment or belongings of the supervised personnel/facilities, and an alert may be transmitted if the supervised personnel/facilities are moved to a controlled area. Also, by installing the PRUs 200 to trolleys in a mall, the positions of the trolleys are able to be monitored. Besides, when the trolleys are moved to a specific position, a display nearby may display an advertisement that meets the user's needs. The embodiments of the invention are applicable to other applications relating to indoor positioning, and may be adjusted based on needs.

In view of the foregoing, the known MR wireless charging technology is combined with Bluetooth communication. Accordingly, the PTU not only provides power to the PRU, but also transmit/receive data to/from the PRU. Accordingly, in the embodiments of the invention, the relative position of a specific PRU is calculated by adjusting the software procedure to add a mechanism of transmitting the UUID and the RSSI value in the profile. Those applying the embodiments of the invention are able to achieve indoor position tracking without modifying the hardware design only by properly setting up the PTUs in the surrounding and optionally disposing the backstage host.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A position tracking method, adapted to determine position of a power receiving unit (PRU) via a plurality of power transmitting units (PTUs), wherein the PTUs transmit power to the PRU based on a magnetic resonance (MR) technology, the position tracking method comprising:
    adaptively choosing, by the PRU, one of the PTUs to receive power through the MR technology, and broadcasting broadcast information via a corresponding wireless communication link with Bluetooth and the MR technology;
    receiving, by three of the PTUs, the broadcast information, and respectively obtaining three pieces of position information with respect to the PRU according to the broadcast information received by the three PTUs; and
    determining a position of the PRU based on the three pieces of pieces of position information with respect to the PRU of the three PTUs.

2. The position tracking method as claimed in claim 1, wherein each of the three pieces of position information with respect to the PRU comprises a received signal strength, and determining the position of the PRU based on the three pieces of position information with respect to the PRU comprises:
    calculating respective distances between the PRU and the PTUs based on received signal strengths of the PRU with respect to the PTUs, and determining the position of the PRU based on the distances.

3. The position tracking method as claimed in claim 1, wherein the received signal strength is included in the broadcast information.

4. The position tracking method as claimed in claim 1, wherein each wireless communication link is a low energy wireless communication link via Bluetooth, and broadcasting the broadcast information via the wireless communication link comprises:
    adding the broadcast information to an universally unique identifier (UUID) of a general attribute profile (GATT) service; and transmitting the broadcast information included in data of the UUID.

5. The position tracking method as claimed in claim 1, wherein determining the position of the PRU based on the three pieces of position information with respect to the PRU comprises:
   determining the position of the PRU based on trilateration.

6. The position tracking method as claimed in claim 1, wherein determining the position of the PRU based on the three pieces of position information with respect to the PRU comprises:
   transmitting the three pieces of position information to a backstage host; and
   determining the position of the PRU by the backstage host.

7. A position tracking system, comprising:
   a plurality of power transmitting units (PTUs), transmitting power based on a magnetic resonance (MR) technology; and
   a power receiving unit (PRU), adaptively choosing one of the PTUs to receive power through the MR technology and broadcasting broadcast information via a wireless communication link with Bluetooth and the MR technology, wherein three of the PTUs respectively receive the broadcast information to obtain three pieces of position information with respect to the PRU according to the broadcast information received by the three PTUs, and a position of the PRU is obtained based on the three pieces of position information with respect to the PRU of the three PTUs.

8. The position tracking system as claimed in claim 7, wherein each of the three pieces of position information with respect to the PRU comprises a received signal strength, and the position of the PRU is obtained based on the respective received signal strengths of the PRU with respect to the PTUs.

9. The position tracking system as claimed in claim 8, wherein the received signal strength is included in the broadcast information.

10. The position tracking system as claimed in claim 7, wherein each wireless communication link is a low energy wireless communication link via Bluetooth, and the PRU adds the broadcast information to an universally unique identifier (UUID) of a general attribute profile (GATT) service and transmits the broadcast information included in data of the UUID.

11. The position tracking system as claimed in claim 7, wherein the position of the PRU is obtained based on trilateration.

12. The position tracking system as claimed in claim 7, further comprising:
   a backstage host, receiving the three pieces of position information with respect to the PRU from the PTUs, and determining the position of the PRU based on the three pieces of position information.

* * * * *